United States Patent [19]

Yanagioka et al.

[11] 4,239,515
[45] Dec. 16, 1980

[54] GAS-LIQUID CONTACT REACTION APPARATUS

[75] Inventors: Hiroshi Yanagioka, Yokohama; Atsushi Futami, Tokyo; Masatake Shinsenji; Minoru Tanaka, both of Yokohama, all of Japan

[73] Assignee: Chiyoda Chemical Engineering & Construction Co., Ltd., Kanagawa, Japan

[21] Appl. No.: 9,504

[22] Filed: Feb. 9, 1979

Related U.S. Application Data

[63] Continuation of Ser. No. 823,463, Aug. 10, 1977, abandoned.

[30] Foreign Application Priority Data

Aug. 10, 1976 [JP] Japan .................................. 51-94540

[51] Int. Cl.³ .......................................... B01D 47/02
[52] U.S. Cl. ........................................ 55/223; 55/241; 55/247; 55/249; 55/255; 261/77; 261/93; 261/122; 422/168; 422/227; 422/231
[58] Field of Search .................. 55/223, 241, 247, 249, 55/255, 256, 242; 261/77, 93, 122, 123, DIG. 54, 84; 422/168, 227, 230, 231

[56] References Cited

U.S. PATENT DOCUMENTS

| 362,375 | 5/1943 | Koppers | 261/122 |
|---|---|---|---|
| 2,023,227 | 12/1935 | Henkel et al. | 261/123 |
| 2,409,558 | 10/1946 | Gunn | 55/249 |
| 2,433,592 | 12/1947 | Booth | 261/93 |
| 2,687,948 | 8/1954 | Gregory et al. | 422/231 |
| 2,719,032 | 9/1955 | Schnur | 55/256 |
| 3,066,921 | 12/1962 | Thommel et al. | 261/93 |
| 3,271,117 | 9/1966 | Letham et al. | 422/227 |
| 3,400,051 | 9/1968 | Hofschneider | 261/93 |
| 3,524,631 | 8/1970 | Mare | 55/255 |
| 3,723,545 | 3/1973 | Nagel et al. | 261/77 |
| 3,756,580 | 9/1973 | Dunn | 55/255 |
| 3,793,809 | 2/1974 | Tomany et al. | 55/223 |
| 3,836,630 | 9/1974 | Noguchi et al. | 423/242 |
| 3,887,660 | 6/1975 | Romantschuk et al. | 261/93 |
| 3,957,466 | 5/1976 | Cappola | 55/256 |

FOREIGN PATENT DOCUMENTS

| 2059415 | 6/1971 | Fed. Rep. of Germany | 261/DIG. 54 |
|---|---|---|---|
| 1308752 | 10/1962 | France | 55/255 |
| 50-130697 | 10/1975 | Japan . | |
| 366241 | 2/1932 | United Kingdom | 261/123 |

Primary Examiner—David L. Lacey
Attorney, Agent, or Firm—Armstrong, Nikaido, Marmelstein & Kubovcik

[57] ABSTRACT

An improved compact apparatus for gas-liquid contact and separation by precipitation of solids therein, which essentially comprises a splash separating section, a solid-gas-liquid contact section and a solid depositing section formed in a single reaction vessel, in which gas is blown into the vessel through a gas disperser having a gas outlet opened below the liquid surface in said solid-gas-liquid contact section and caused to undergo contact with the phase of a suspension forcibly circulated from said solid depositing section formed below said solid-gas-liquid contact section, whereby the precipitated solids are prevented from depositing the inner surface of the vessel and other attendant members.

5 Claims, 3 Drawing Figures

GAS-LIQUID CONTACT REACTION APPARATUS

This is a continuation of application Ser. No. 823,463, filed Aug. 10, 1977, now abandoned.

BACKGROUND OF THE INVENTION

The present invention relates to solid-gas-liquid reaction apparatus which permits both gas liquid contact process and solid precipitation simultaneously in a single reaction vessel.

There are known various simultaneous methods of making a gas-liquid contact and solid precipitation possible. One is known as a flue gas desulfurizing process which consists of processing flue gas from boilers, etc. in an aqueous solution containing an alkali or acid and eliminating $SO_2$ from the flue gas by absorption. Another is a method of producing ammonium sulfate by processing a content of ammonia gas in a gas from a coke furnace by employing a medium of sulfuric acid. A third is a method of manufacturing hydroxylamine in which nitrogen oxide produced by oxidizing ammonia with air is absorbed by water, and is reacted with ammonium sulfite. A fourth is the ammonia-soda process of manufacturing soda ash. When large quantities of gas are processed in the above conventional methods, the gas-liquid contact reaction apparatus used includes a tower in which countercurrents of gas and liquid are brought in contact, a packed column, a plate column, a spray column, etc. The solid precipitation apparatus used includes various types depending on the purpose, and because of the necessity of suspending solids, all types employ a barrel-type vessel having a stirrer therein. For large quantities of gas continuously to be processed by placing the gas in contact with a liquid and by obtaining solids by precipitation, it is usual that the gas-liquid contact apparatus and the precipitating apparatus are provided independently or separately because of their different functions and constructions, and are connected by pump and piping system.

The present inventors have studied possibilities of combining the two different apparatus into a single unit and it has been revealed that combining the two units physically or simply will only make a large apparatus and will thus not have the benefit of the combination. It has been observed that a solution to the above problem can be provided by a new process of making contact between a gas and liquid in the presence of a solid.

OBJECTS OF THE INVENTION

The present invention has been realized on the basis of the above, and it is accordingly one object of the present invention to provide a compact and high performance reaction apparatus which permits both gas-liquid contact process and solid precipitation to be performed simultaneously in a single reaction vessel.

BRIEF SUMMARY OF THE INVENTION

Briefly described, the apparatus according to the invention comprises:

(a) a reaction vessel for causing a contact between a gas and a liquid in the presence of a solid and/or in the presence of newly precipitated solids, said vessel including a splash separating section, solid-gas-liquid contact section and solid precipitating section;

(b) a gas introducing pipe having an opening at the lower end thereof below said solid-gas-liquid contact section;

(c) gas dispersing means extending from said lower end of said gas introducing pipe, for providing a solid-gas-liquid contact section thereon, said gas dispersing means having a side wall extending therefrom;

(d) a stirrer and/or air introducing pipe in the solid precipitating section, for forming a suspension containing solid particles and for making an exchange between a mixture of solid, gas and liquid above and said suspension below by forced circulation.

DETAILED DESCRIPTION OF THE EMBODIMENTS

Figure 1:
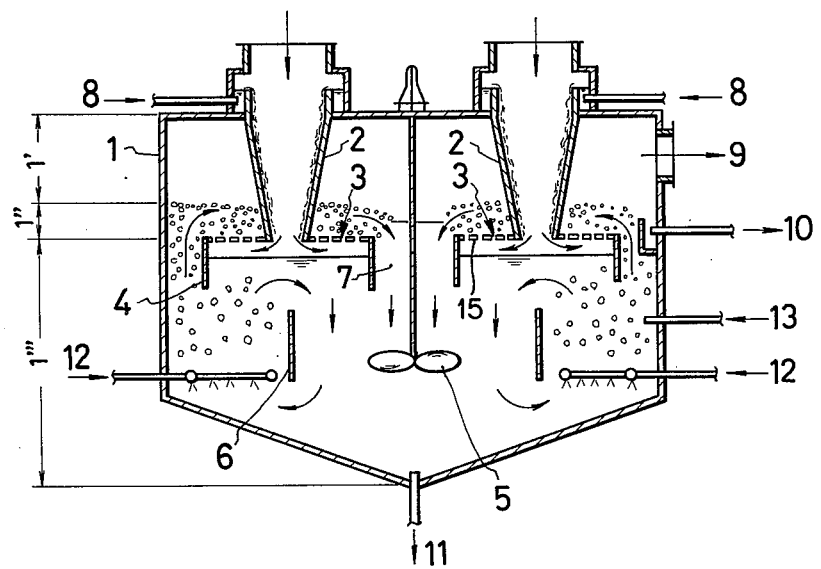
FIGS. 1 to 3 are vertical cross-sectional views of varied forms of the apparatus embodying the present invention, illustrating schematically the apparatus in operation.

According to the present invention, the gas-liquid contact and solid precipitation functions are united in a single vessel, the vessel having three sections which include the upper splash separating section, intermediate solid-gas-liquid contact section providing a layer of a mixture of solid, gas and liquid, and lower solid precipitating section forming a solid-liquid suspension layer, whereby both gas-liquid contact and solid precipitation can be achieved simultaneously. The vessel is therefore necessarily constructed to have a sufficient height to allow the three sections to be contained therein. The lower open end of the gas introduction pipe reaches under the solid-gas-liquid contact layer whose formation should be desired on the basis of performance requirement (conversion), and has a gas disperser having a side wall extending downwardly. A flow of gas delivered under pressure from the gas introducing pipe is prevented by the side wall from being dissipated in horizontal directions, and is therefore jetted out at very high velocity through the gas bubbling means into the solid-gas-liquid contact layer, producing finely divided gas bubbles which form a uniform liquid-continuous gas bubble layer (froth), or a solid-gas-liquid contact section over the gas disperser. One feature of the invention is that the mass transfer and chemical reaction take place by collision of a high rate current of gas with a current of liquid in the solid-gas-liquid contact section and by the gas-liquid contact which produces turbulence while the gas is being divided into fine gas bubbles as well as by the contact which occurs in the froth layer. The section defined by the gas bubble layer is herein referred to as the solid-gas-liquid contact section, and the gas which leaves the gas bubble layer unabsorbed in the layer is accompanied with a splash of liquid therefrom as the bubbles burst. It is therefore necessary to separate that portion of gas containing fine liquid droplets from the burst bubbles from the liquid droplets and thus, a sufficient space area above the gas bubble section is provided to avoid deposition of solids possibly present in the splash to the inner wall of the vessel; the space area being herein referred to as splash separating section. The region defined by the gas disperser and its side wall is filled with a gas under pressure from the gas introducing pipe, thus pressing the liquid surface level down. This eliminates the possibility of clogging notches or orifices of the gas disperser with solids, and thus permits both gas-liquid contact reaction and solid precipitation in a single vessel. In order to permit the desired mass transfer and reaction to be effected simultaneously in the solid-gas-liquid contact section defined in the upper portion of the vessel, it is necessary that those portions of solid and liquid whose mass transfer and reaction have been completed are removed from the solid-gas-liquid contact section while new portions of solid and liquid which possess capabilities of promoting the mass transfer and reaction are instead introduced to the above section. This can be achieved by a natural circulation of the solid-liquid mixture caused by a difference in specific gravity between the two mixtures in the upper and lower portions of the vessel, and by a forced circulation caused by mechanical and/or air stirring means. In other words, the solid suspension produced in the solid precipitating section is made to pass outside the side wall of the gas disperser and rise past it without clogging the gas disperser, traveling up toward the solid-gas-liquid contact section where it has a sufficient contact with a gas, and then passing through for example a downtake down to the solid precipitating section below. The downtake has the function of further promoting the circulation of the solid suspension. The liquid layer portion below the gas bubble layer (the portion below the level of the gas disperser) is herein referred to as solid precipitating section. In the solid precipitating section, a liquid delivery pipe which supplies a liquid, or eventually a slurry, is provided which is used for fixing an absorbed gas and a reaction product obtained by chemical reaction thereof and which contains a dissolved compound for precipitating the gas to solids.

As readily understood from the foregoing description, in accordance with the invention, the suspension can be circulated between the solid-gas-liquid contact section and solid precipitating section without the use of a pumping system, and by making an effective use of the stirrer for producing a mixture of a solid and a liquid, promoting their reaction and suspending solids, which are also required in the conventional precipitating apparatus, in cooperation with the natural circulation caused by a difference in specific gravity through the downtake between the two mixtures in the upper and lower portions of the vessel. The feature of the invention is therefore in that both the gas-liquid contact and solid precipitation can be permitted simultaneously in a single vessel without any clogging problem.

The apparatus according to the invention further permits an increased interface area in the solid-gas-liquid contact section and thus improved absorption and reaction efficiencies. It is well known that in the reaction between the three different phases of solid, gas and liquid, the mass transfer and overall reaction rate depend on the interface area, and therefore the gas disperser according to the invention usually comprises a perforated plate, but the plate may be provided with one or more nets, grids, screens, and the like thereon for producing more finely divided gas bubbles therethrough, so that the mass transfer and reaction can take place more effectively.

In accordance with the conventional gas-liquid contact reaction apparatus, if nets, grids, screens or the like are provided so that the mass transfer and reaction can take place between the solid suspended liquid and the gas in contact, the produced solids disadvantageously become readily deposited on or in those nets, etc. which thereby become clogged with solids. According to the invention, such deposition and clogging problem can be eliminated by turbulently bringing the flow of the solid and liquid into contact with one another. The stirrer and/or air introduction pipe in the solid precipitating section has one or more cylindrical baffles concentrically surrounding it so that the gas-liquid mixture and its circulation can take place more effectively.

An additional feature of the invention is in eliminating all problems or troubles that may arise from deposition of solids. In the prior art cited earlier, in the region where a gas and a liquid come in contact with each other for the first time, the energy of the flowing gas is not strong enough to detach solids away from the spots to which they are deposited, and solids tend to grow to a thickness with time until finally the passages of the gas become clogged with solids, thus rendering the apparatus practically inoperative. According to the apparatus of the invention, solids which may be produced by contact of a gas with a liquid can descend without adhering to the gas passages by the provision of covering the walls of the gas passages with a film of liquid in the vessel or from the outside so that there can take place a turbulent solid-gas-liquid contact in the gas dispersing region. As means to prevent deposition of solids, there are, in addition to the earlier mentioned method of forming a wet film on the wall, a mechanical scraping method, a method of adding seed crystals, and use of deposition resistant materials. The most effective and secure method is the mechanical scraping, but this method is practically difficult to use if there are numerous gas introduction pipes installed. The wet film forming means according to the invention proves to be practically effective and useful, and is advantageous when there are numerous gas introduction pipes.

Now, the invention will further illustrated by reference to the accompanying drawings, in which FIG. 1 is a vertical cross-section view of an example of the apparatus embodying the invention illustrating the apparatus in operation and showing flows of gas and liquid by solid-line arrows. In FIG. 1, the reference numeral 1 designates a reaction vessel; 2, a gas introduction pipe; 3, a gas disperser; 4, a side wall extending downwardly from the gas disperser; 5, stirrer; 6, a baffle; 7, a downtake; 8, a liquid supply line for forming a wet film over the inner wall of the pipe 2; 9, a gas outlet; 10, 11, suspension outlets; 12, air introduction pipe; and 13, reactant supply pipe.

Figure 2:
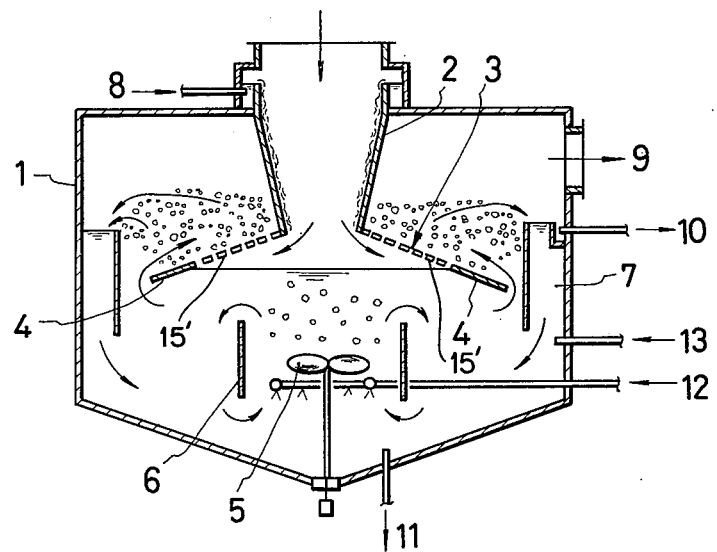

Two gas introduction pipes are shown in FIG. 1, but either one or more than two pipes may be provided. The gas disperser 3 shown in FIG. 1 has a horizontal plate 15 extending outwardly from the lower open end of the pipe 2. The plate 15 has a plurality of holes thereon from which a further vertical side wall extends downwardly. However, the disperser 3 may have a varied form as shown in FIG. 2 which is a vertical cross-sectional view of another preferred embodiment and in which the gas disperser 3 has an inclined perforated plate 15' and a gently inclined side wall 4. As a substitute for the perforated plates in FIGS. 1 and 2, a net, grid, screen or the like, or a combination of any ones thereof, may be used. A flow of gas which is introduced under pressure into the vessel 1 through gas introduction pipe 2, fills the space surrounded by the gas disperser 3 and its vertical side wall 4, bringing the liquid surface to a lower level under the pressure of the gas while bubbling out through the gas disperser 3 at a velocity of 6 to 80 m/sec. This forms a layer of gas bubbles (solid-gas-liquid mixture contact section), designated by 1", by disturbing a solid-liquid suspension with turbulence through contact therewith. The gas is then absorbed by the gas bubble layer 1" while the unabsorbed portion of the gas flows through splash separating reation 1' and through gas outlet 9 to the outside. The gas rises through the gas bubble layer or solid-gas-liquid contact region or section 1" at a velocity of 0.5 to 4 m/sec., preferably 0.5 to 2 m/sec.

Figure 3:
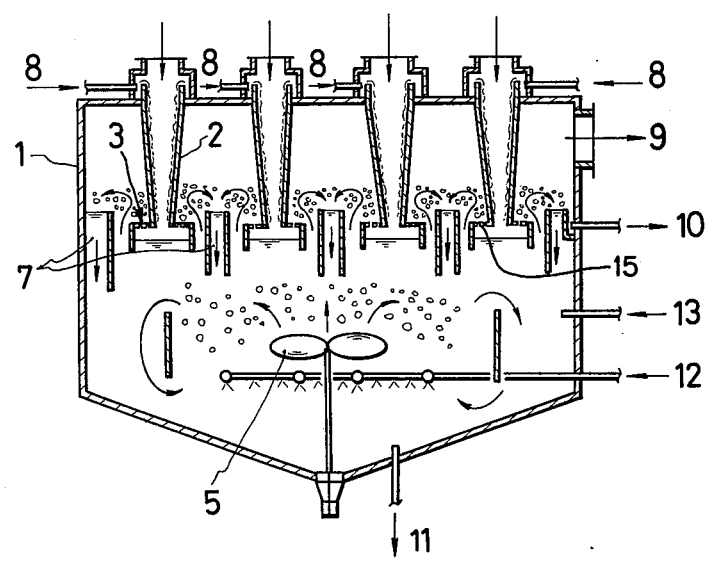

Above the gas introduction pipe 2 is provided a liquid supply line 8 which supplies a flow of liquid forming a wet film on the internal wall of the pipe 2 which prevents the pipe 2 from being clogged with deposited solids, thus eliminating the use of mechanical scraping means while permitting a continuous operation of the apparatus. It should be noted that the wet film forming is more effective particularly if a number of small pipes are installed. Other various methods of forming a wet film than typically shown in FIG. 1 are possible. In a section 1''' where solids are formed by precipitation, a reactant through its supply pipe 13 is fed into a rising flow of air from stirrer 5 and/or air introduction pipe 12, and reacts with the absorbed portion of the gas by which reaction solids are formed by precipitation. The presence of the side wall 4 of the gas disperser 3 causes a flow of suspension rising inside the baffe 6 to travel outside the side wall 4 into the solid-gas-liquid contact section 1" where the suspension has a sufficient contact with the gas while its mass transfer and reaction take place, after which it goes to the downtake 7 and descends therethrough. The suspension circulates through the aforementioned path as long as there is a difference in specific gravity between a suspension outside the stirrer 5 and downtake 7 containing air bubbles and a suspension inside the downtake 7 containing no air bubbles. The downtake 7 shown in FIG. 1 is located centrally of the vessel 1 or apparatus while it may be provided along the outer circumference of the vessel 1 as shown in FIG. 2. As shown in FIG. 3 illustrating a vertical cross-section of a further varied embodiment, a plurality of regularly spaced downtakes 7 shown in cross section may be provided.

The apparatus has at the lower portion thereof a suspension produced with the accompanying reaction and with a constant solid concentration as required. Liquid and/or solid in the suspension may also be oxidized whereever the case so requires. The suspension excluded from the vessel 1 through outlet 11 at bottom flows further to a centrifugal separator (not shown) which separates the suspension into liquid and solid.

For ease of understanding of the accompanying effects of the apparatus according to the invention, the results obtained from experiments on the apparatus are given as non-limitative Examples, as follows:

EXAMPLE 1

The apparatus was constructed such that it comprises a 800 mm diameter vessel of a circular cross-section containing a liquid of 1800 mm depth, two gas introduction pipes 2 each of 3 inch diameter immersed 400 mm deep and each having semi-circular horizontal perforated plates 3 extending outwardly from the lower open end of the pipe on opposite sides thereof, said plates 3 each having a vertical flanged side wall 4 extending downwardly therefrom, a stirrer 5, a 500 mm diameter cylindrical baffle 6, and apertured pipe sparger (which corresponds to air introduction pipe 12 shown), and a delivery pipe 13 from which a solution of $Na_2CO_3$ was supplied. Then, 1000 $Nm^3$/hr of a gas containing 1000 ppm of $H_2S$ was delivered under pressure into the vessel 1, and was made to form a 500 to 900 mm high gas bubble layer over the plates 3. In the meantime, a solution of $Na_2NO_3$ containing disulphonic acid soda of the quinone group such as anthraquinone disulphonic acid soda, naphtoquinone disulphonic acid soda, was supplied from the pipe 13 while 15 $Nm^3$/hr of air was supplied from the pipe sparger. A discharge of gas from the gas outlet 9 contained less than 100 ppm of $H_2S$ and a suspension from the outlet 11 was delivered directly to a filter press which separates the solid sulphurs.

EXAMPLE 2

The apparatus of Example 1 was used. 1000 $Nm^3$/hr of a gas containing 1000 ppm of $SO_2$ was delivered under pressure while an aqueous solution containing chlorine of the organic acids such as citric acid, malic acid, was supplied from the pipe 13. 100 $Nm^3$/hr of air containing hydrogen sulfide gas was also supplied from the pipe 12. The result showed over 75% of desulfurization obtained. A suspension containing precipitated solid sulphurs was removed through pipe 11 and was then separated by filter press to sulphur solids.

EXAMPLE 3

The apparatus of Example 1 was used. 1200 $Nm^3$/hr of a gas containing 1000 ppm of $SO_2$ was delivered under pressure while a slurry of $CaCO_2$ was supplied. 15 $Nm^3$/hr of air was also supplied from pipe 12. The result obtained showed 95% of desulfurization. A suspension containing $CaSO_4 2H_2O$ was withdrawn through pipe 11 to centrifugal separator for separation. During the operation, no problem of clogging the plates 3 which might otherwise occur due to deposited solids was observed.

As clearly seen from the above results, the apparatus constructed according to the invention advantageously permits both gas-liquid contact reaction and solid precipitation in a single vessel and has a very wide operating range.

What is claimed is:

1. Gas-liquid contact reaction apparatus comprising a vessel having a liquid therein, said vessel being provided with funnel-shaped gas introducing means extending from the top of the vessel downwardly to a substantially central portion of the vessel, said gas introducing means having at its lower open end a flared skirt-like perforated gas dispersing means and a non-perforated side wall member disposed around the lower end periphery of said gas dispersing means, said gas dispersing means being disposed completely below the liquid level and adapted to form above the same a froth layer of a mixture of a solid, liquid and gas, whereby when gas is introduced into the vessel there is formed in the vessel a splash separating section above said froth layer of a solid, liquid and gas mixture, an intermediate solid-gas-liquid contact section including said froth layer, and a lower solid precipitating section below said froth layer, said splash separating section including means comprising a space for separating gas from a splash liquid and a gas outlet for allowing gas to flow from said space, said solid-gas-liquid contact section including means positioned below and contiguous with said splash separating section comprising a lower end portion of said gas introducing means introducing the gas into the end portion for dispersing the gas through said skirt-like perforated gas dispersing means, for preventing the gas from escaping by the side wall member and for compressing the liquid beneath said gas dispersing means, such that the level of the liquid beneath the gas dispersing means is lower than the level of the liquid in said solid-gas-liquid contact section and wherein a space is formed between said gas dispersing means and the level of the liquid below the gas dispersing means, said gas dispersing means being positioned with respect to said gas introducing means such that the gas is forced to bubble up through the gas dispersing means to rise through the liquid in the solid-gas-liquid contact section and wherein the solids are introduced into the end portion together with the gas through the open bottom below said gas dispersing means, thus avoiding plugging of the gas dispersing means, and said solid precipitating section is positioned below and contiguous with said contact section and has a stirrer and an air introducing means therein for forming a suspension containing solid particles and for causing circulation, thereby making an exchange between a mixture of solid, gas and liquid thereabove.

2. Apparatus as defined in claim 1 further comprising liquid supply means on top of the inner wall of the gas introducing means for supplying a stream of liquid as a wet film over the inner wall of said gas introducing means for preventing deposition of any solids on said inner wall.

3. Apparatus as defined in claim 6 wherein said gas dispersing means comprises a gas bubble producer selected from the group consisting of a perforated plate a net, a grid or a screen.

4. Apparatus as defined in claim 1, wherein said reaction vessel includes downtakes connecting said solid-gas-liquid contact section and said solid precipitating section.

5. Apparatus as defined in claim 1, wherein a baffle is provided surrounding said stirrer and air introducing means.

* * * * *